United States Patent [19]
Wakui

[11] Patent Number: 5,742,339
[45] Date of Patent: Apr. 21, 1998

[54] ELECTRONIC STILL VIDEO CAMERA

[75] Inventor: Yoshio Wakui, Tokyo, Japan

[73] Assignee: Asahi Kogaku Kogyo Kabushiki Kaisha, Tokyo, Japan

[21] Appl. No.: 818,030

[22] Filed: Mar. 14, 1997

Related U.S. Application Data

[63] Continuation of Ser. No. 577,376, Dec. 22, 1995, abandoned.

[30] Foreign Application Priority Data

Dec. 27, 1994 [JP] Japan .................................. 6-339172

[51] Int. Cl.⁶ .................................................. H04N 5/30
[52] U.S. Cl. .................. 348/233; 348/231; 348/232; 348/239; 358/906; 358/335; 360/33.1
[58] Field of Search ........................ 348/231, 232, 348/207, 233, 239; 358/335, 906; 360/33.1, 36.1, 48, 14.2; 354/72, 105, 109, 68, 69, 469; H04N 5/30

[56] References Cited

U.S. PATENT DOCUMENTS

| 4,827,347 | 5/1989 | Bell | 358/224 |
|---|---|---|---|
| 4,982,291 | 1/1991 | Kurahashi et al. | 358/335 |
| 5,016,107 | 5/1991 | Sasson et al. | 348/231 |
| 5,086,345 | 2/1992 | Nakane et al. | 358/335 |
| 5,093,731 | 3/1992 | Watanabe et al. | 358/335 |
| 5,111,300 | 5/1992 | Nam | 358/209 |
| 5,221,965 | 6/1993 | Okino | 358/335 |
| 5,339,199 | 8/1994 | Ogawa | 348/231 |
| 5,359,465 | 10/1994 | Miyadera | 360/35.1 |
| 5,452,022 | 9/1995 | Yamamoto et al. | 348/231 |
| 5,473,370 | 12/1995 | Moronaga et al. | 348/231 |
| 5,477,264 | 12/1995 | Sarbadhikari et al. | 348/233 |
| 5,481,303 | 1/1996 | Uehara | 348/231 |
| 5,493,335 | 2/1996 | Paruiski et al. | 348/273 |
| 5,500,743 | 3/1996 | Sakaegi et al. | 358/403 |
| 5,502,486 | 3/1996 | Ueda et al. | 348/239 |
| 5,502,487 | 3/1996 | Choi | 348/239 |

Primary Examiner—Glenton B. Burgess
Attorney, Agent, or Firm—Greenblum & Bernstein P.L.C.

[57] ABSTRACT

An electronic still video camera having a built-in memory for storing a plurality of frames of image data, and a removable memory for storing a plurality of frames of image data. At least one of the plurality of frames of image data stored in the built-in memory is selected. The selected plurality of frames of image data stored in the built-in memory are then transferred to the removable

43 Claims, 8 Drawing Sheets

ELECTRONIC STILL VIDEO CAMERA

This application is a continuation of application Ser. No. 08/577,376, filed Dec. 22, 1995, now abandoned.

BACKGROUND OF THE INVENTION

The present invention relates to an electronic still video camera.

In a conventional electronic still video camera (hereinafter referred to as a camera), an image is formed by a photographing optical system on an imaging device, such as a CCD (Charge Coupled Device). The image signal output by the imaging device is processed and stored in a removable IC memory card.

When an operator presses a shutter release button, image data is captured and stored in the IC memory card. However, if the shutter button 15 accidentally depressed, the image data is still stored in the IC memory card. If the operator wishes to remove the image data stored in the IC memory card, the IC memory card just be removed from the camera and connected to a data processing device, such as computer. Then the data can be deleted. However, this is an inconvenient and time consuming process.

SUMMARY OF THE INVENTION

It is therefore an object of the present invention, to provide an electronic still video camera in which only the desired image data is stored on the IC memory card, without the need for deleting unwanted image data.

According to a first aspect of the present invention, there is provided an electronic still video camera having a built-in memory for storing a plurality of frames of image data, and a removable memory for storing a plurality of frames of image data. At least one of the plurality of frames of image data stored in the built-in memory is selected. The selected plurality of frees of image data stored in the built-in memory are then transferred to the removable memory.

Thus, in the preferred embodiment, only the frames of image data that the operator wants to store permanently are stored in the removable memory.

Optionally, the electronic still video camera has a monitor for displaying the plurality of index images. This facilitates the selection of the frames of image data that are to be transferred from the built-in memory to the removable memory.

Further optionally, the electronic still video camera generates an index number corresponding to each of the index images, and superimposes the index numbers on each of the corresponding index images. This further facilitates the selection of the images that are to be transferred from the built-in memory to the removable memory.

In the preferred embodiment, the electronic still video camera has a temporary storage memory for storing the image data read out of the built-in memory, and a controller for reading out a portion of the image data stored in the temporary storage memory. Thus, a compressed index image will be displayed on the monitor.

According to a second aspect of the present invention, an electronic still video camera has a first memory for storing a plurality of frames of image data, a second memory for also storing the plurality of frames of image data, and a device for displaying a plurality of index images corresponding to the plurality of frames of image data stored in the first storing device. At least one of the plurality of displayed index images is selected. The image data stored in the first memory corresponding to the selected plurality of index images is then transferred to the second memory.

In a preferred embodiment, the first memory is a built-in memory, and the second memory is a removable memory. Thus, the operator selects which of the images are to be transferred to the removable memory.

In a the preferred embodiment, the plurality of frames of image data are compressed in order to form the plurality of index images. Then all of the index images are displayed at the same time. This facilitates selection of the images that are to be transferred from the built-in memory to the removable memory.

Optionally, the electronic still video camera generates an index number corresponding to each of the index images, and superimposes the index numbers on each of the corresponding index images. This further facilitates the selection of the images that are to be transferred from the built-in memory to the removable memory.

In a preferred embodiment, the index number of the index image which can be selected blinks. When the image is selected, a predetermined character is displayed next to the index number. In a preferred embodiment, a letter "S" is displayed.

In this embodiment, an up switch and a down switch are used to change the index number that blinks to the next higher index number or the next lower index number, respectively. Furthermore, the blinking index image can be selected by pressing the release switch.

In a preferred embodiment, the first memory is a flash memory, and the second memory is an IC memory card. Further, the flash memory is built into the electronic still video camera, while the IC card memory is removable.

Optionally in a preferred embodiment, the storage capacity of the IC memory card is determined before the transfer of image data.

According to a third aspect of the present invention, there is provided an electronic still video camera which has an imaging device for detecting an image of an object, the imaging device outputting a frame of image data and a first memory for storing a plurality of frames of the image signal. Each of the frames of image data is compressed and an index image corresponding to each of the frames of image data is output to a display. At least one of the displayed index images is selected. A controller controls a transfer of the image data corresponding to the selected images from the first memory to a second memory.

According to a fourth aspect of the present invention, there is provided a method of storing image data on a data storage device that is removable from an electronic still video camera, the electronic still video camera having a built-in image data memory, the method including the steps of:

producing a frame of image data corresponding to an image of an object;

storing the frame of image data in the built-in memory;

displaying a plurality of index images corresponding to the plurality of frames of image data stored in the built-in memory;

selecting at least one of the plurality of displayed index images; and transferring image data stored in the built-in memory to the removable storage device, the transferred image data corresponding to the at least one of the selected plurality of index images.

According to a fifth aspect of the present invention, there is provided a method of transferring image data stored in a built-in memory of an electronic still video camera to a removable memory, the method including the steps of:

displaying index images corresponding to the stored image data;

selecting at least one of the displayed index images; and transferring the image data corresponding to the at least one selected index image from the built-in memory to the removable memory.

DESCRIPTION OF THE EMBODIMENTS

Figure 1A:
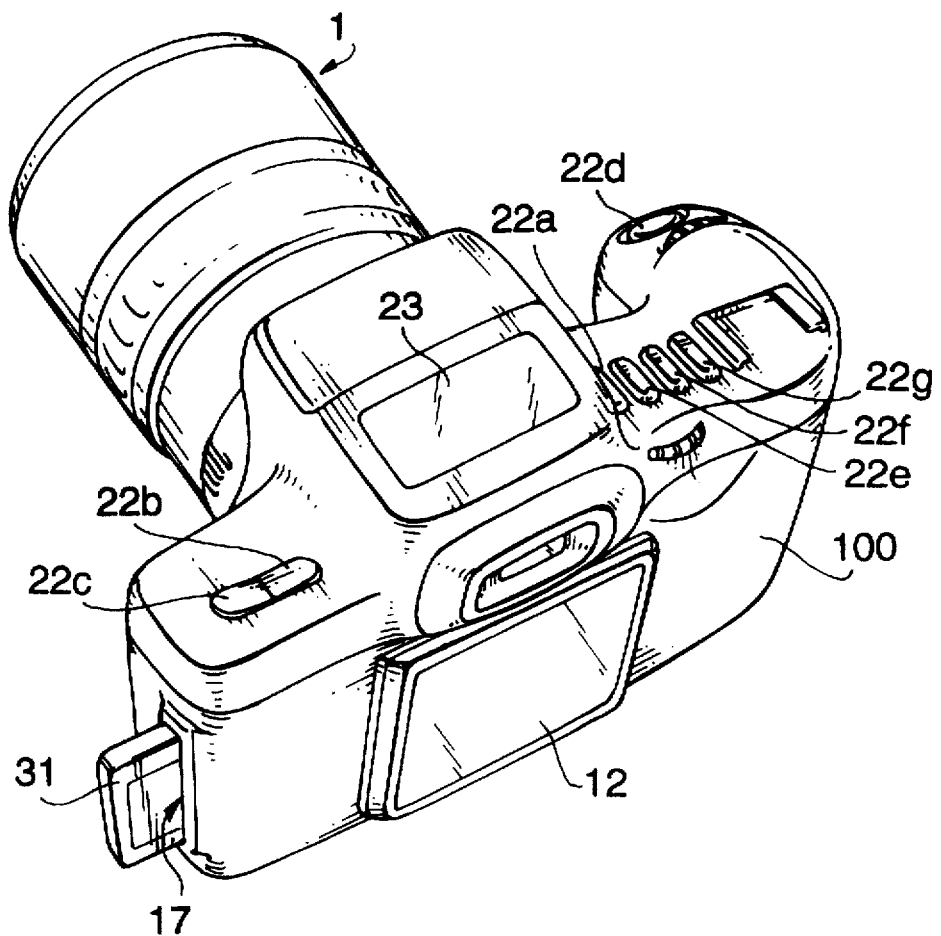
FIG. 1A shows an electronic still video camera which embodies the present invention.

FIG. 1A shows an electronic still video camera 100 (hereinafter referred to as camera 100) which embodies the present invention. A photographing optical system 1, which is detachably coupled to the camera 100, forms an image of an object to be photographed, on an imaging surface of a CCD 3 (see FIG. 1B). The image may be viewed through a finder optical system, as well as through an LCD monitor 12. In the preferred embodiment, the LCD monitor 12 is located on a back panel of the camera 100.

An insertion unit 17, has a slot located at a side of the camera 100, through which an IC memory card 31 is inserted.

A power switch 22a, UP/DOWN switches 22b and 22c, a release switch 22d, a storage mode switch 22e, an operating mode switch 22f, and a transfer mode switch 22g, are provided on the top of the casing of the camera 100.

the storage mode switch 22e selects whether the image flash memory 20 or the IC memory card 31 is to be used as a storage medium. The operating mode switch 22f selects one of a recording mode, a reproducing mode, or a deleting mode. The transfer mode switch 22g sets the camera 100 to a data transferring mode, and overrides the setting of the operating mode switch 22f.

An indication unit 23 is provided on the top of the casing of the camera 100, and may include an LCD display panel and a plurality of LEDs (Light Emitting Diodes). The indication unit 23 indicates an ON/OFF status of the power switch 22a, the mode selected by the storage mode switch 22e, the mode selected by the operating mode switch 22f, and whether the transferring mode is selected. The indication unit 23 also displays the current time and date, the existence of the IC memory card 31, a warning, and a completion of a data transfer process.

Figure 1B:
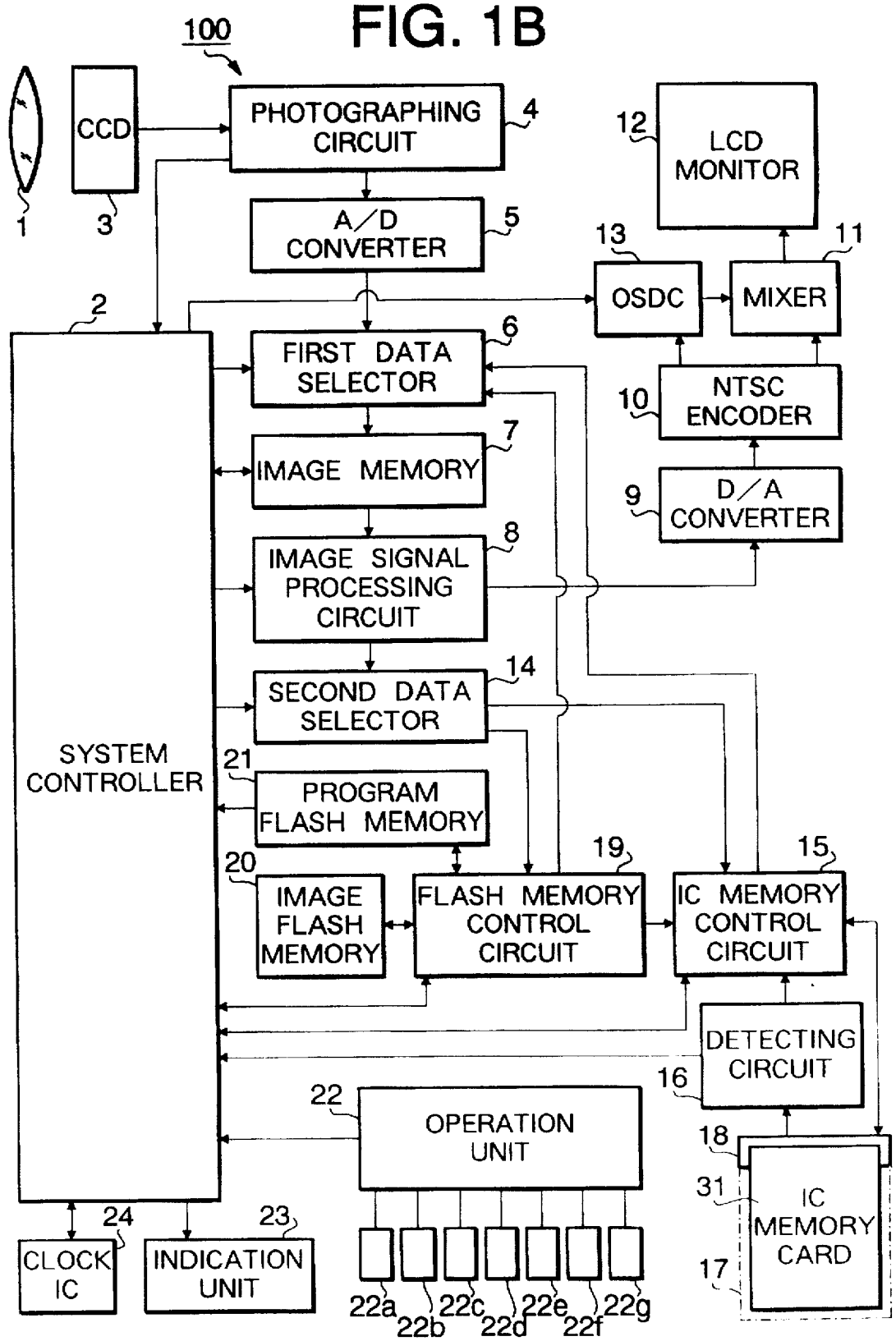
FIG. 1B shows a block diagram of the electronic still video camera shown in FIG. 1A.

FIG. 1B shows a block diagram of the camera 100 shown in FIG. 1A. As shown in FIG. 1B, the camera 100 further accommodates a system controller 2, an image flash memory 20, controlled by a flash memory controller 19, and a program flash memory 21 for storing program data. The insertion unit 17 is provided with a connector 18 in order to connect with the IC memory card 31.

As mentioned above, the image of the object to be photographed is formed on the CCD 3 by the photographing optical system 1. The CCD 3 outputs image data to an image reading circuit (i.e., photographing circuit) 4, which processes the image data and outputs an analog image signal to an A/D converter 5. The analog signal is digitized and transferred through a first data selector 6 to an image memory 7. The digital data is stored in the memory 7, and then processed by an image processing circuit 8. A second data selector 14 selects whether the processed digital data is to be stored in the image flash memory 20 or the IC memory card 31.

Further, the processed digital signal output from the image processing circuit 8 is converted to an analog signal by a D/A converter 9, and then converted to a video signal by an NTSC encoder 10. A mixer 11 then mixes the video signal with a character generation signal generated by an on-screen display controller 13. The mixed video signal is then displayed on the LCD monitor 12.

The system controller 2 has a microprocessor which controls an operation of the camera 100. A clock circuit 24, an operation unit 22 and the indication unit 23 are connected to the system controller 2. The operation unit 22 detects an operation of the switches 22a through 22g, and outputs an operation signal to the system controller 2.

The camera 100 has an eject switch (not shown) for ejecting the IC memory card 31 inserted in the insertion unit 17. The connector 18 of the insertion unit 17 has a plurality of connector pins which are inserted in the receptacles of the inserted IC memory card 31.

The image flash memory 20 is a non-volatile memory for storing image data photographed by the camera 100. The program flash memory 21 is also a non-volatile memory and stores a program for controlling data transmission between the IC memory card 31 and the image memory 7. The image flash memory 20 and the program flash memory 21 have a plurality of data storage blocks. Thus, the data stored in the image flash memory 20 and IC memory card 31 can be deleted in blocks.

Further, each data storage block of the image flask memory 20 has an image data storing area associated with a data existence bit. One frame of image data is stored in one data storage block. The data existence bit is set to "0" when image data is stored in the corresponding image data storing area, and in set to "1" when no image data is stored in the corresponding image data storing area. The system controller 2 determines whether data is stored in each block based on the value of the data existence bit.

When data stored in the image flash memory 20 is deleted, all the bits corresponding to the deleted area are set to "1". Therefore, when image data at a certain block is deleted, the data existence bit of the block is automatically set to "1", which indicates that no data is stored. When another image is stored in the block, the data existence bit of the block is reset to "0".

The IC memory card 31 is a non-volatile memory having an IC (Integrated Circuit) memory. The IC memory includes an area for storing the image data, and an area for storing data related to the IC memory card 31. The data related to the IC memory card 31 includes the type (static RAM or flash memory), storage capacity, and access speed of the memory.

The IC memory card control circuit 15 is electrically connected to the connector 18, and controls the data transmission between the IC memory card 31, and the camera 100.

In order to use the IC memory card 31, an operator manually inserts the IC memory card 31 through an opening of the insertion unit 17. After the IC memory card 31, contacts the connector 18, the card 31 is pushed in further to improve the integrity of the connection between the connector 18 and the IC memory card 31.

A detecting circuit 16 is provided on the connector 18, and detects whether the inserted IC memory card 31 is electrically connected to the connector 18. Specifically, the detecting circuit 16 outputs a "LOW" signal when all the connector pins of the connector 18 are connected with all of the receptacles of the IC memory card 31. Otherwise, a "HIGH" signal is outputted. The output signal of the detecting circuit 16 is transferred to the IC memory card control circuit 15 and the system controller 2. The system controller 2 recognizes the existence of the IC memory card 31 based on the signal output by the detecting circuit 16. Further, the system controller 2 sends a signal to the indication unit 23 to indicate that the IC memory card 31 is inserted.

When the IC memory card 31 is ejected, a card ejection mechanism (not shown) is used. By operating the eject switch (not shown), the card ejection mechanism ejects the IC memory card 31.

The flash memory control circuit 19 is connected to the IC memory card control circuit 15, and the program flash memory 21 is controlled by the system controller 2.

The general operation of the camera 100 will be described in more detail below.

An image of an object to be photographed is formed on an imaging surface of the CCD 3 by the photographing optical system 1.

The CCD 3 has a plurality of image receiving pixels each of which accumulates charges in accordance with an amount of light corresponding to the image formed on the imaging surface of the CCD 3. A Complementary color (i.e., Magenta (Mg), Yellow (Ye), Cyan (Cy), or Green (G)) filer (not shown) is provided in front of each pixel of the CCD 3. Four adjacent CCD pixels, each having one of the four color filters above, correspond to one picture unit. The image signal reading circuit 4 reads the charges accumulated on each pixel of the CCD 3 and outputs four analog image signals, corresponding to the four colors magenta, yellow, cyan and green.

The analog image signals output by the image signal reading circuit 4 are converted to digital signals by the A/D converter 5. The digital signals are transferred to the image memory 7 through the first data selector 6. The first data selector 6 selects one of three signals output from the A/D converter 5, the flash memory control circuit 19, and the IC memory card control circuit 15, respectively. The system controller 2 controls the operation of the first data selector 6.

The image memory 7 temporarily stores,the digital signals at a predetermined address. Each of the digital signals is read out of the image memory 7 and transferred to the image processing circuit 8. The image processing circuit 8 converts the digital signals into a brightness signal (Y) and two color difference signals (Cr and Cb). The signals Y, Cr and Cb are then output to the second data selector 14.

The second data selector 14 routes the signals Y, Cr, and Cb to the LCD monitor 12, and one of the flash memory control circuit 19 or the IC memory card control circuit 15.

The system controller 2 controls the operation of the second data selector 14.

The signals Y, Cr and Cb are output to the D/A converter 9 which converts the signals to analog signals. The NTSC encoder 10 generates NTSC video signal, including horizontal and vertical synchronous signals, based on the analog signals Y, Cr and Cb, and a clock signal which is transmitted to the NTSC encoder 10 from a clock generator (not shown). The NTSC signal is then transferred to the mixer 11. Further, the horizontal and synchronous signals are transferred to the on-screen display controller (OSDC) 13. The OSDC 13 generates a numerical character signal corresponding to the frame number of the reproduced image. The numerical character signal is transferred to the mixer 11, where it is mixed with the NTSC video signal. The mixed signal is then displayed on the LCD monitor 12.

As mentioned above, the camera 100 can be operated in a recording mode, a reproducing mode, a deleting mode, and a transfer mode. Further, the image information can be stored in the image flash memory 20 or the IC memory card 31. The operation of camera 100 in the various modes will be described below.

Flash Memory Data Recording Mode

The flash memory data recording mode is set by turning the operating mode switch 22f to "Record" and the storage mode switch 22e to "Flash Memory".

In this mode, the first data selector 6 receives the input signal from the A/D converter 5. Further, the system controller 2 controls the second data selector 14 to route the digital signals to the flash memory controller 19. The flash memory controller 19 stores the signals Y, Cr and Cb in the image data storing area of the image flash memory 20, when the release button 22d is turned ON. As mentioned above, the existence bit of the block where the data is stored is set to "0", to indicate that the data exists.

Flash Memory Data Reproducing Mode

The flash memory data reproducing mode is set by turning the operating mode switch 22f to "Reproduce" and the storage mode switch 22e to "Flash Memory".

When the release switch 22d is depressed, the system controller 2 controls the flash memory control circuit 19 to read the signals Y, Cr and Cb from the image storage area of the image flash memory 20.

Initially, image data stored in a predetermined block (for instance the first block) is read out of the flash memory 19 and displayed on the LCD monitor 12. The block of image data that is read is changed by using the up switch 22b and the down switch 22c. The next image is then displayed on the LCD monitor 12. Further, the system controller 2 controls the first data selector 6 to receive data from the flash memory control circuit 19.

The signals Y, Cr and Cb are read out of the image flash memory 20 and stored at a predetermined address of the image memory 7. The signals Y, Cr and Cb are transmitted through the image processing circuit 8, and then converted into an analog signal by the D/A converter 9, and processed by the NTSC encoder 10.

The mixer 11 synthesizes (mixes) the video signal transmitted from the NTSC encoder 10 and the character signal transmitted from the OSDC 13. The synthesized signal is transmitted to the LCD monitor 12 and displayed. The displayed image is an image corresponding to the data read from the image flash memory 20. In response to another operation of the release switch, the reproducing operation is terminated.

IC Memory Card Data Recording Mode

The IC memory card data recording mode is set by turning the operating mode switch 22f to "Record" and the storage mode switch 22e to "IC Card Memory".

In this mode, the system controller 2 controls the first data selector 6 to receive the signal from the A/D converter 5. However, the system controller 2 controls the second data selector 14 to route the signals Y, Cr and Cb to the IC memory card control circuit 15. The IC memory card control circuit 15 then stores the data in the IC memory of the IC memory card 31, when the release button 22d is turned ON.

IC Memory Card Data Reproducing Mode

The IC memory card data reproducing mode is set by turning the operating mode switch 22f to "Reproduce" and the storage mode switch 22e to "IC Card Memory".

When the release switch 22d is depressed, the system controller 2 controls the IC memory card control circuit 15 to read the signals Y, Cr and Cb from the image storage area of the IC memory card 31.

Initially, image data stored in a predetermined block (for instance the first block) is read out of the IC memory card 31 and displayed on the LCD monitor 12. The block of image data that is read out is changed by using the up switch 22b and the down switch 22c. The next image is then displayed on the LCD monitor 12. Further, the system controller 2 controls the first data selector 6 to receive data from the IC memory card control circuit 15.

The signals Y, Cr and Cb are read out of the IC memory card 31 and stored at a predetermined address of the image memory 7. The signals Y, Cr and Cb are transmitted through the image processing circuit 8, and then converted into an analog signal by the D/A converter 9, and processed by the NTSC encoder 10.

The mixer 11 synthesizes (mixes) the video signal transmitted from the NTSC encoder 10 and the character signal transmitted from the OSDC 13. The synthesized signal is transmitted to the LCD monitor 12 and displayed. The displayed image is an image corresponding to the data read from the IC memory card 31 with its frame number superimposed over the displayed image. In response to another operation of the release switch 22d, the reproducing operation is terminated.

Data Transfer Mode

In the data transfer mode, data stored in the image flash memory 20 is transferred to the IC memory card 31. The data is reproduced from the image flash memory 20, and the stored images are compressed and shown on the LCD monitor 12, with the corresponding frame numbers superimposed on each of the images. The user selects which of the images are to be stored on the IC memory card 31, using the operation keys, and then the selected images are stored. The process of displaying the images on the LCD monitor 12, and selecting the images to be transferred to the IC memory card 31 will be described with reference to FIGS. 2A through 6 below.

In the preferred embodiment, the image flash memory 20 can store a total of nine images. When the data transfer mode is selected, all of the images stored in the image flash memory 20 are displayed in compressed form on the LCD monitor 12.

Figure 2A:
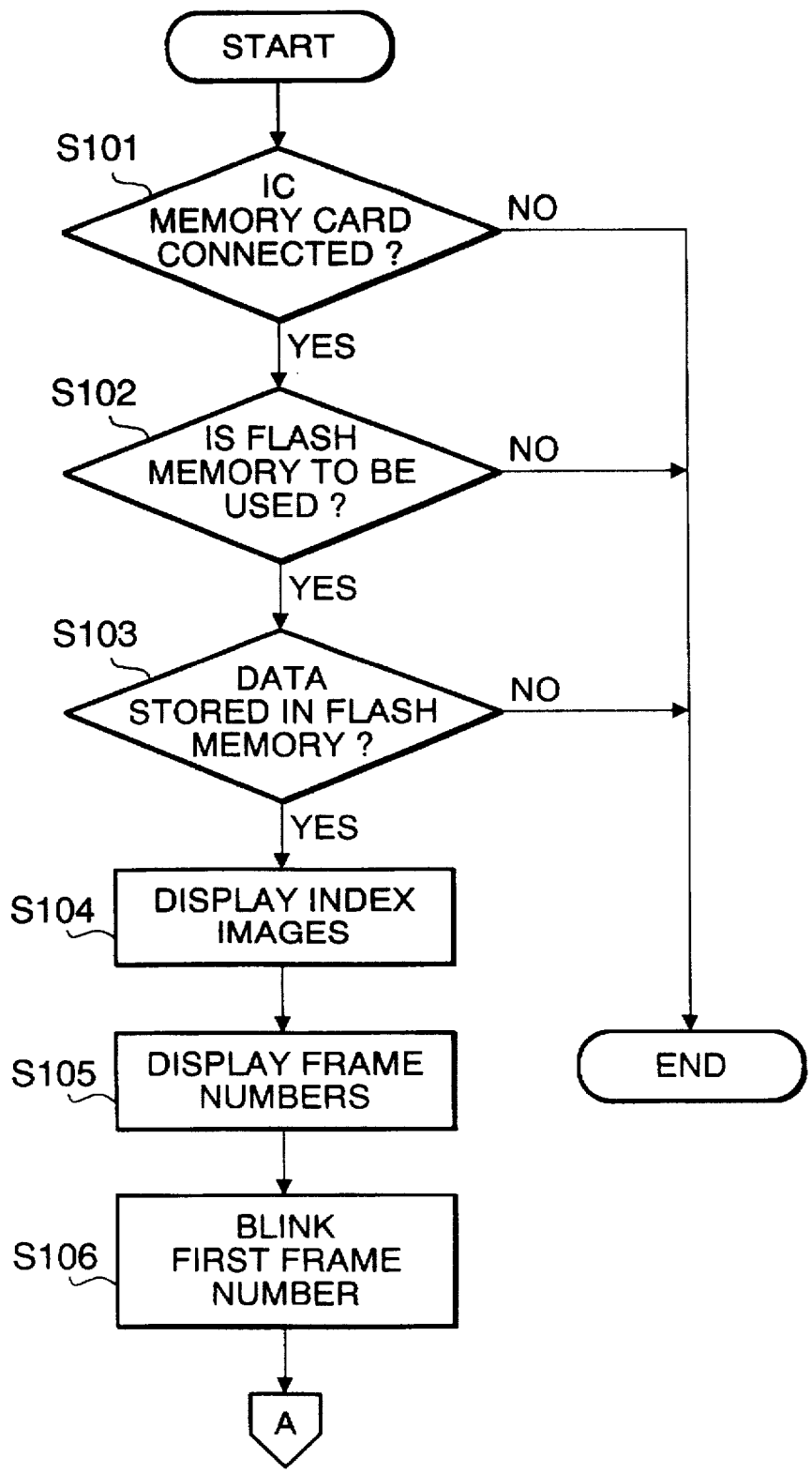
FIGS. 2A and 2B show a flowchart of a data transfer process of the electronic still video camera shown in FIG. 1A.
Figure 2B:
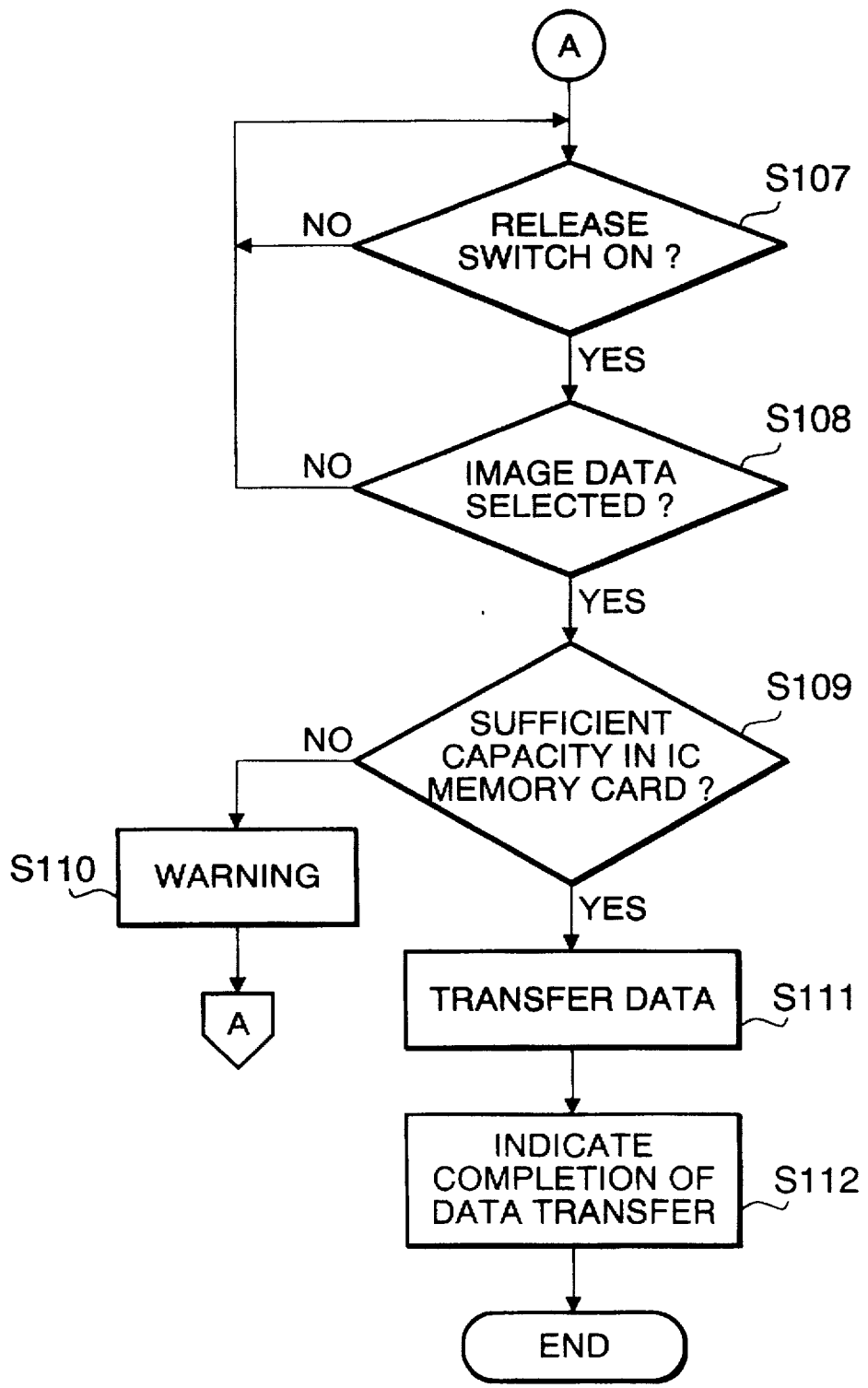

FIGS. 2A and 2B show a flowchart of the data transfer process.

Initially, the data transfer switch 22g is turned ON to set the data transfer mode. Then, in step S101, the system controller 2 determines based on the output of the detecting circuit 16 whether the IC memory card 31 is connected to the connector 18 of the insertion unit 17.

If the IC memory card 31 is not inserted or is inserted but not connected to the connector 18 (S101:N), then the routine ends. Otherwise (S101:Y), control proceeds to step S102 which determines whether the image flash memory 20 is selected.

If the image flash memory 20 is not selected (S102:N), the routine ends. If the image flash memory 20 is selected (S102:Y), then step S103 determines whether any image data is stored in the image flash memory 20. If no image data is stored in the image flash memory 20 (S103:N), the routine ends.

If there is image data stored in the image flash memory 20 (S103:Y), then the compressed images are displayed on the LCD 12 in step S104. The process of displaying the compressed images will be described below.

Figure 3:
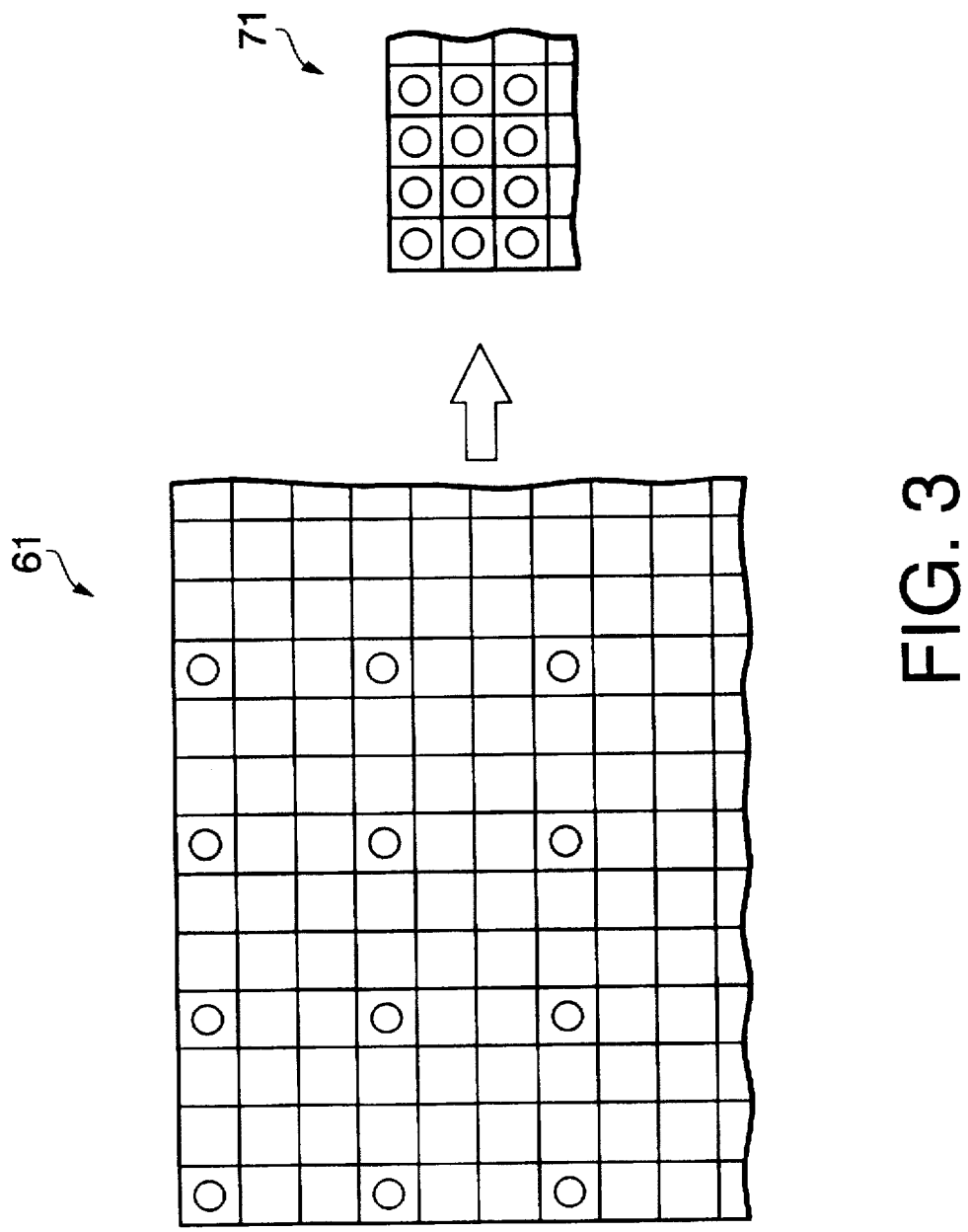
FIG. 3 shows a map of image data sorted in a flash memory of the electronic still video camera shown in FIG. 1A.

FIG. 3 shows a portion of a map of the image data 61 stored in the image flash memory 20. Each square represents one pixel of image data. In order to display nine images on the LCD monitor 12, the system controller 2 controls the flash memory control circuit 19 to read one ninth of all of the pixels of image data (i.e., circled data in FIG. 3) to generate compressed data 71, which is stored in the memory 7. Therefore, nine images can be shown on the LCD monitor 12 at the same time.

Then, in step S105, the frame numbers of the compressed images are superimposed on top of the images. This process is explained with reference to FIG. 4.

Figure 4:
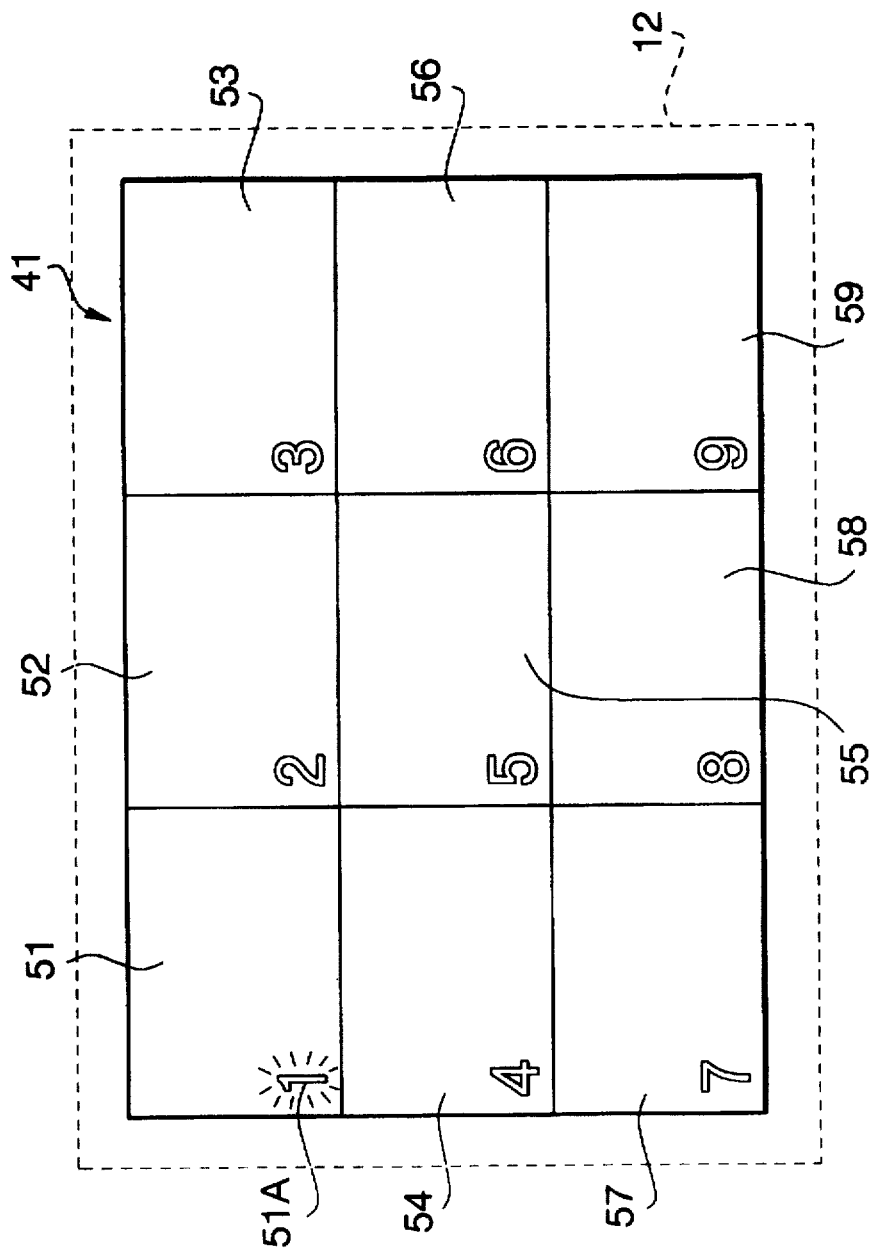
FIG. 4 shows an example of stored images displayed on an LCD monitor of the electronic still video camera shown in FIG. 1A.

As shown in FIG. 4, the LCD monitor 12 displays an index screen image 41 having nine compressed images 51 through 59. The nine compressed images represent image data stored in the nine blocks of the image flash memory 20. If one of the blocks of the image flash memory 20 has no data, then the compressed image displayed for that block has a predetermined color.

In order to display the frame numbers, the system controller 2 controls the OSDC 13 to generate the frame numbers "1" through "9" for the compressed images 51 through 59, respectively. The character signals are transmitted to the mixer 11 which mixes the character signals and the video signal generated by the NTSC encoder 10, and outputs the combined video signal to the LCD monitor 12. Thus, the frame numbers are superimposed on the compressed images displayed on the LCD monitor 12.

In step S106, the first frame number 51A is blinked, since the system controller 2 controls the OSDC 13 to blink the first frame number when the data transfer mode switch 22g is first turned ON.

This indicates that the user can select the images to be transferred from the image flash memory 20 to the IC memory card 31. Further, an interrupt procedure (described later and shown in FIG. 5) used to select images to be transferred to the IC card memory 31, is enabled.

If the UP switch 22b is turned ON, the interrupt procedure is started, and the next higher frame number begins blinking. Alternatively, if the DOWN switch 22c is turned ON, the interrupt procedure is also started, and the next lower frame number begins blinking. If either the UP switch 22b or DOWN switch 22c is turned ON, and the release switch 22d is also turned ON, the image with the blinking frame number is selected, and the interrupt procedure is ended. The interrupt procedure may be repeated by turning ON either the UP switch 22b or DOWN switch 22c again. Once all the images that are to be transferred to the IC memory card 31 have been selected, the transfer (i.e., batch transfer) of the image data is actuated by turning ON the release switch 22d.

Step S107 determines whether the release switch 22d has been turned ON. If the release switch 22d is not turned ON (S107:N), then step S107 is repeated until the release switch 22d is turned ON. If the release switch 22d has been turned ON (S107:Y), then step S108 determines whether any images were selected during the interrupt procedure. If no image data was selected (S108:N), then the interrupt procedure is enabled and control returns to step S107. If image data was selected (S108:Y), then step S109 checks whether the reining capacity of the IC memory card 31 can store the selected images.

If there is not enough capacity left in the IC card memory 31 (S109:N), then a warning is indicated in step S110. The interrupt procedure is then enabled and control returns to step S107.

If there is enough capacity in the IC card memory 31 to store the selected images (S109:Y), then step S111 transfers the image data from the image flash memory 20 to the IC card memory 31. In step S111, the system controller 2 controls the flash memory control circuit 19 to retrieve the block of image data from the image flash memory 20 corresponding to each selected image. Then all of the selected image data is transferred (i.e., batch transferred) to the IC card memory control circuit 15, which controls the writing of the data to the IC card memory 31.

After all of the selected image data has been transferred to the IC memory card 31, step S112 indicates on the indication unit 23 that the data transfer has been completed. The routine then ends.

Figure 5:
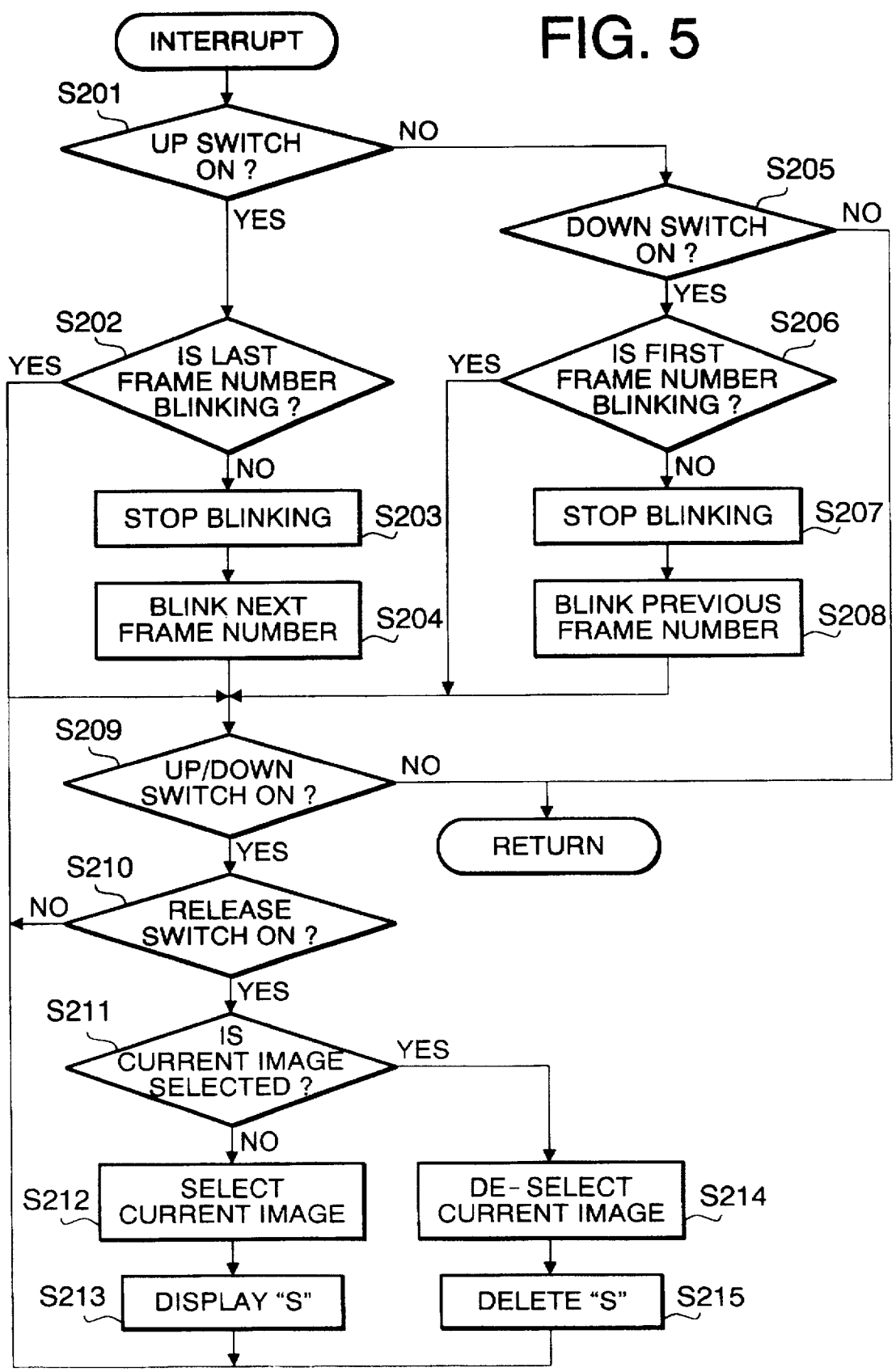
FIG. 5 shows a flowchart of an interrupt procedure of the electronic still video camera shown in FIG. 1A.
Figure 6:
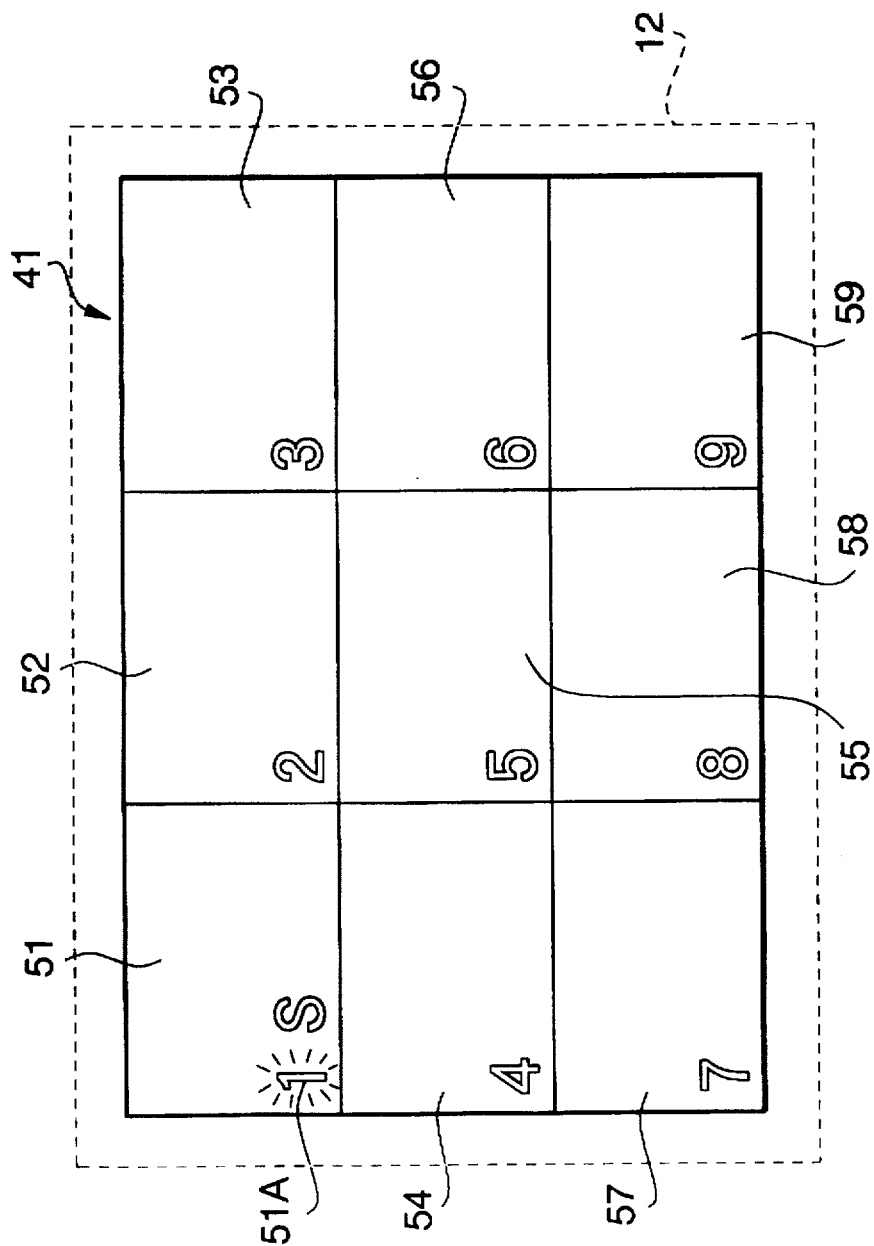
FIG. 6 shows an example of stored images displayed on an LCD monitor of the electronic still video camera shown in FIG. 1A, when one of the images is selected.

The interrupt procedure performed when either the UP switch 22b or the DOWN switch 22c is turned ON in step S106, will be described below with reference to FIGS. 5 and 6.

Step S201 determines if the UP switch 22b is turned ON. If the UP switch 22b is turned ON (S201:Y), then step S202 determines whether the blinking number is the last frame number (i.e., in this embodiment, the number "9").

If the blinking number is not the last frame number (S202:N), then in step S203, the system controller 2 controls the OSDC 13 to stop blinking the current number. In step S204, the system controller 2 controls the OSDC 13 to blink the next higher number. Control then proceeds to step S209.

If the blinking number is the last frame number (S202:Y), then control also proceeds to step S209.

If the UP switch 22b was not depressed in step S201, then step S205 determines whether the DOWN switch 22c is ON. If the DOWN switch 22c is OFF, then the interrupt procedure ends.

If the DOWN switch is. ON (S205:Y), then step S206 determines whether the blinking number is the first frame number (i.e., in this embodiment, the number "1").

If the blinking number is not the first frame number (S206:N), then in step S207, the system controller 2 controls the OSDC 13 to stop blinking the current number. In step S208, the system controller 2 controls the OSDC 13 to blink the next lower number. Control then proceeds to step S209.

If the blinking number is the first frame number (S206:Y), then control also proceeds to step S209.

Step S209 determines whether one of the UP switch 22b or the DOWN switch 22c is still ON. If neither switch is still ON, then the routine ends.

Therefore, in order to continue changing the frame number that blinks, the switch 22b or 22c must be turned ON again in order to actuate the interrupt procedure.

If either switch 22b or 22c is still ON (S209:Y), then step S210 determines whether the release switch 22d is also being depressed. If the release switch 22d is not depressed (S210:N), then control returns to step S209. Otherwise (S210:Y), step S211 determines whether the current image is selected. If the current image is not selected (S211:N), then step S212 selects the current image.

The selection of the current image will be described with reference to FIG. 6.

When the current image is selected, the system controller controls the OSDC 13 to generate a character "S" to be superimposed next to the displayed index number of the selected image. For example, in FIG. 6, the selected image 51 has the letter "S" superimposed on the image and to the right of the number "1". Further, a RAM of the system controller 2 has a flag (data bit) to indicate a transfer status of each block. Initially, all the flags are cleared (i.e., set to "0"). When the current image is selected, the flag corresponding to the selected block of image data is set to "1" to indicate that the block of image data is to be transferred from the image flash memory 20 to the IC card memory 31.

Thus, the step S212 displays the character "S" next to the index number of the selected image. Control then returns to S209.

If the current image is selected (S211:Y), then in step S214, the current image is deselected, and step S215 deletes the letter "S". Therefore, in step S215, the system controller 2 controls the OSDC 13 to delete the letter "S"which is displayed next to the index number of the selected image. Further, the flag corresponding to the deselected block of image data is cleared (i.e., set to "0") to indicate that the block of image data is not to be transferred from the image flash memory 20 to the IC card memory 31. Control then returns to step S209.

Thus, as described above, by actuating the interrupt repeatedly a plurality of images (i.e. any number of the stored images, selected in any order) stored in the image flash memory 20 can be selected and then transferred to the IC memory card 31. After the data has been transferred, all the flags are cleared (i.e., set equal to "0").

Therefore, in the preferred embodiment, the electronic still video camera initially stores the image data in the built-in image flash memory 20. Then, in the data transfer mode, all of the stored images are compressed and displayed on the LCD monitor 12. This allows a user of the electronic still video camera to select which images should be transferred from the image flash memory 20 to the removable IC memory card 31.

Therefore, only the image data corresponding to the selected images is transferred to the IC memory card 31, and the recording of unnecessary image data in the IC memory card 31 is prevented. Further, the operator does not need to delete the image data stored in the IC memory card by using a computer or another data processing device, in order to erase accidentally stored images, since all images are first stored in the image flash memory 20 and then selectively transferred to the IC memory card 31. Furthermore, the image data stored in the image flash memory 20 can be transferred to the IC memory data in an order preferred by the operator. In this case, after the operator has selected each image, the operator would transfer the image data. Thus, the number of IC memory cards 31 can be reduced since only the desired image data is recorded in the IC memory card 31.

Furthermore, the deterioration of the IC memory due to the repeated recording/deleting of the image data is also reduced, thereby increasing the effective life of the IC memory card 31.

As also described, the operator can select a plurality of image data, and transfer the plurality of selected image data from the image flash memory 20 to the IC memory card 31 at one time by depressing only the release switch 22a. This facilitates the editing and transferring of image data.

In the preferred embodiment, all the index images are shown in a screen at the same time. However, the invention is not limited to this type of display. It is also possible to show a single image which corresponds to a block of the flash memory, and then change or scroll through the images in response to the operation of the UP/DOWN switches 22b and 22c. Furthermore, an electronic view finder can be substituted for the LCD monitor 12.

In the embodiment, a character "S" is superimposed on the index image corresponding to the selected image data. The indication of the selected image data is not limited to this method, but any other method, for example, the changing of the color of the frame number displayed on the index image, is also applicable. Further, a color or a pattern of a border of the index image my also be changed in order to indicate that the index image has been selected. Furthermore, a character or image may be superimposed on index images which have not been selected, thereby leaving the selected index images unchanged.

The present disclosure relates to a subject matter contained in Japanese Patent Applications No. HEI 6-339172, filed on Dec. 27, 1995, which is expressly incorporated herein by reference in its entirety.

What is claimed is:

1. An electronic still video camera comprising:
   a built-in memory for storing a plurality of frames of image data;
   a memory removable from said electronic still video camera, said removable memory storing a plurality of frames of image data;
   means for selecting a subset from said plurality of frames of image data, said subset comprising a variable number of frames of image data selected from said plurality of frames of image data stored in said built-in memory;
   means for storing a transfer status of each frame of image data in said selected subset, said transfer status of each frame indicating whether said frame is to be transferred in a batch; and
   means for batch transferring said selected subset, in accordance with said stored transfer statuses from said built-in memory to said removable memory.

2. The electronic still video camera according to claim 1, further comprising a monitor for displaying a plurality of index images corresponding to said plurality of frames of image data stored in said built-in memory.

3. The electronic still video camera according to claim 2, further comprising:
   means for generating an index number corresponding to each of said plurality of index images; and
   means for superimposing each said index number on each of said corresponding index images.

4. The electronic still video camera according to claim 3, wherein said selecting means comprises:
   means for changing a displayed condition of one of said index numbers; and
   means for indicating that said one of said index numbers having said changed displayed condition is selected.

5. The electronic still video camera according to claim 1, further comprising:
   means for reading said plurality of frames of image data out of said built in memory;
   a temporary storage memory for storing all of said plurality of frames of image data read out of said built in memory; and
   a controller for reading out a portion of said plurality of frames of image data stored in said temporary storage memory, said portion of said plurality of frames of image data used to form a plurality of index images corresponding to said plurality of frames of image data.

6. The electronic still video camera according to claim 1, further comprising:
   means for simultaneously displaying a plurality of index images corresponding to said plurality of frames of image data stored in said built-in memory.

7. The electronic still video camera according to claim 6, further comprising:
   means for simultaneously displaying respective index numbers corresponding to each of said simultaneously displayed plurality of index images.

8. The electronic still video camera according to claim 1, wherein said means for storing a transfer status comprises a bank of flags, each flag corresponding to one of said plurality of frames of image data, and each flag being settable to store said transfer status.

9. The electronic still video camera according to claim 2, further comprising:
   means for generating a selection marking for each one of said frames of image data of said selected subset; and
   means for superimposing said selection marking on those of said plurality of index images corresponding to said frames of image data of said selected subset.

10. An electronic still video camera comprising:
    first means for storing a plurality of frames of image data;
    second means for storing a plurality of frames of image data;
    means for displaying a plurality of index images corresponding to said plurality of frames of image data stored in said first storing means;
    means for selecting a subset from said plurality of index images, said subset comprising a variable number of index images selected in any order from said plurality of index images displayed on said displaying means, said variable number being from at least one to at most all of said plurality of index images;
    means for generating selection markings;
    means for superimposing said selection markings on only those index images of said selected subset; and
    means for batch transferring only those frames of image data corresponding to said index images of said selected subset, from said first memory means to said second memory means, said batch transferring means thereby transferring together a variable number of frames of image data selected in any order from said plurality of frames of image data, from said first memory means to said second memory means.

11. The electronic still video camera according to claim 10, further comprising means for compressing said plurality of frames of image data to form said plurality of index images.

12. The electronic still video camera according to claim 10, further comprising: means for generating a plurality of separate index numbers corresponding respectively to each of said plurality of index images; and
    means for superimposing said separate index numbers, respectively, on each of said corresponding index images.

13. The electronic still video camera according to claim 12, wherein said selecting means comprises:
    means for changing a displayed condition of one of said index numbers when an index image having said one of said index numbers superimposed thereon, is selectable by said selecting means.

14. The electronic still video camera according to claim 13, wherein said displayed condition changing means blinks said index number.

15. The electronic still video camera according to claim 13, wherein said selecting means further comprises means for moving said displayed condition changing means, wherein said displayed condition changing means changes the displayed condition of at least one of a next higher index number and a next lower index number.

16. The electronic still video camera according to claim 15, wherein said displayed condition changing means comprises a first switch and a second switch, said displayed condition changing means changing a displayed condition of said next higher index number in response to said first switch being turned ON, and said displayed condition changing means changing a displayed condition of said next lower index number in response to said second switch being turned ON.

17. The electronic still video camera according to claim 15, further comprising a switch for actuating and deactuating said selecting means.

18. The electronic still video camera according to claim 15, wherein said selection marking comprises a predetermined character.

19. The electronic still video camera according to claim 10, wherein said first memory means comprises a flash memory, and said second memory means comprises an IC memory card.

20. The electronic still video camera according to claim 10, wherein one of said first storing means and said second storing means is built into said electronic still video camera, and the other of said first storing means and said second storing means is detachably connected to said electronic still video camera.

21. The electronic still video camera according to claim 10, wherein at least one of said first storing means and said second storing means is detachably connected to said electronic still video camera.

22. The electronic still video camera according to claim 10, wherein said batch transferring means comprises a transfer switch, wherein said only those frames of image data corresponding to said index images of said selected subset are transferred from said first memory means to said second memory means in response to an operation of said transfer switch.

23. The electronic still video camera according to claim 10, further comprising means for determining whether said second storing means has enough capacity for storing said transferred image data.

24. An electronic still video camera comprising:
an imaging device for detecting an image of an object, said imaging device outputting a frame of image data;
a first memory for storing a plurality of frames of said image data;
a compression unit for compressing each of said plurality of frames of image data, said compression unit outputting an index image corresponding to each of said plurality of frames of image data;
a display for displaying said index images;
a selector for selecting, in any order, a variable number of said displayed index images, said variable number being from at least one to at most all of said displayed index images;
a selection marking generating device that generates a selection markings;
a superimposing device that superimposes said selection markings on only those of said displayed index images selected by said selecting means;
a second memory for storing said frames of image data which correspond to said variable number of selected index images; and a system controller for controlling a batch transfer of said frames of image data which correspond to said variable number of selected index images, from said first memory to said second memory.

25. The electronic still video camera according to claim 24, further comprising:
an on-screen display controller, said on-screen display controller generating an index number signal for each of said displayed index images; and
a mixer for mixing said index numbers with said index images.

26. The electronic still video camera according to claim 25, wherein said controller controls said on-screen display controller to blink one of said index numbers.

27. The electronic still video camera according to claim 26, wherein said selection marking generating device comprises an on-screen display controller operated by said system controller, and wherein said system controller controls said on-screen display controller to generate said selection marking in response to said selector selecting one of said index images.

28. The electronic still video camera according to claim 27, wherein said system controller controls said on-screen display controller to stop generating said selection marking in response to said selector deselecting one of said index images.

29. The electronic still video camera according to claim 26, wherein said selector comprises: an up switch; a down switch; and a release switch,
wherein said controller controls said on-screen display controller to blink a next higher index number in response to said up switch being turned ON, and
wherein said controller controls said on-screen display controller to blink a next lower index number in response to said down switch being turned ON, and
wherein said controller controls said on-screen display controller to generate said selection marking when said release switch is turned ON while one of said up switch and said down switch is also turned ON.

30. The electronic still video camera according to claim 29, wherein said controller transfers said selected image data corresponding to said selected index images to said second memory in response to said release switch being turned ON alone.

31. The electronic still video camera according to claim 24, wherein said display simultaneously displays said index images.

32. A method of storing image data on a data storage device that is removable from an electronic still video camera, the electronic still video camera having a built-in image data memory, the method comprising:
producing a frame of image data corresponding to an image of an object;
storing the frame of image data in the built-in memory;
repeating the production and storing steps as desired so as to store a plurality of frames of image data;
simultaneously displaying a plurality of index images corresponding to the plurality of frames of image data stored in the built-in memory;
selecting, in any order, a subset comprising a variable number of the plurality of displayed index images, said variable number being from at least one at most all of said plurality of displayed index images;
generating a selection marking for each one of said frames of image data of said selected subset; and
batch transferring together frames of image data stored in the built-in memory to the removable storage device, the batch transferred frames of image data being only said variable number of frames of image data corresponding to the selected subset of index images.

33. The method according to claim 32, further comprising compressing the image data stored in the built-in memory in order to form the index images.

34. The method according to claim 32, wherein the built-in memory is a flash memory.

35. A method of transferring image data stored in a built-in memory of an electronic still video camera to a memory removable from said electronic still video camera, the method comprising:

displaying index images corresponding to the stored image data;

selecting a subset comprising a variable number of the displayed index images, said variable number being at least one and at most all of said displayed index images;

storing a transfer status of each frame of image data corresponding to said displayed index images in said selected subset, said transfer status of each frame indicating whether said frame is to be transferred in a batch; and batch transferring only image data corresponding to the selected subset of displayed index images, in accordance with said stored transfer statuses, from the built-in memory to the removable memory.

36. The method according to claim 35, further comprising:

generating an index number corresponding to each of the index images; and superimposing each index number on each of the corresponding index images.

37. The method according to claim 36, the selecting a variable number of the displayed images comprises:

changing a displayed condition of one of each index numbers; and indicating that each index number having the changed displayed condition is selected and has a stored transfer status.

38. The method according to claim 37, wherein the indicating that the index number having the changed displayed condition is selected comprises displaying a predetermined character next to each index number having the changed displayed condition.

39. The method according to claim 37, wherein the changing the displayed condition of one of the index numbers comprises blinking the index number.

40. The electronic still video camera according to claim 10, wherein said means for displaying simultaneously display said plurality of index images.

41. An electronic still video camera comprising:

a built-in memory for storing a plurality of frames of image data;

a memory removable from said electronic still video camera, said removable memory storing a plurality of frames of image data;

means for simultaneously displaying a plurality of index images corresponding to said plurality of frames of image data stored in said built-in memory;

means for selecting, in any order, a variable number of said plurality of simultaneously displayed index images, said variable number being any number of said plurality of simultaneously displayed index images;

means for generating selection markings;

means for superimposing said selection markings on each one of said variable number of simultaneously displayed index images selected by said selecting means; and means for performing a batch operation on only frames of image data corresponding to those of said plurality of simultaneously displayed index images selected by said selecting means and on which said selection markings are superimposed.

42. An electronic still video camera comprising:

first means for storing a plurality of frames of image data;

second means for storing said plurality of frames of image data;

means for simultaneously displaying a plurality of index images corresponding to said plurality of frames of image data stored in said first storing means;

means for selecting, in any order, a variable number of said plurality of index images simultaneously displayed on said displaying means, said variable number being from at least one to at most all of said simultaneously displayed index images; and means for storing a transfer status of those frames of image data corresponding to said Selected index images, each transfer status indicating whether a corresponding frame is to be transferred in a batch;

means for batch transferring image data stored in said first memory means to said second memory means, said batch transferred image data corresponding to only those frames of image data corresponding to said selected index images selected by said selecting means.

43. An electronic still video camera comprising:

an imaging device for detecting an image of an object, said imaging device outputting a frame of image data;

a firsts memory for storing a plurality of frames of said image data;

a compression unit for compressing each of said plurality of frames of image data, said compression unit outputting an index image corresponding to each of said plurality of frames of image data;

a display for simultaneously displaying said index images;

a memory containing a bank of flags, each flag corresponding to one of said plurality of frames of image data;

a selector for selecting at least one of said simultaneously displayed index images, said selector setting only said flags corresponding to said those of said simultaneously displayed index images selected by said selector;

a second memory for storing a plurality of frames of image data;

an operation switch; and a controller for controlling a batch transfer of said frames of image data, said controller batch transferring together all of said frames of image data having set flags when said operation switch is operated, from said first memory to said second memory.

* * * * *

UNITED STATES PATENT AND TRADEMARK OFFICE
CERTIFICATE OF CORRECTION

PATENT NO. : 5,742,339
DATED : April 21, 1998
INVENTOR(S) : Yoshio WAKUI

It is certified that error appears in the above-indentified patent and that said Letters Patent is hereby corrected as shown below:

On the title page, Abstract, line 9, after "removable" insert --memory--.

Signed and Sealed this

Fourth Day of August, 1998

Attest:

Attesting Officer

BRUCE LEHMAN

Commissioner of Patents and Trademarks